Sept. 10, 1968    H. O. SCHRÖTER    3,400,606
HAND OPERATED BRAKE
Filed April 24, 1967
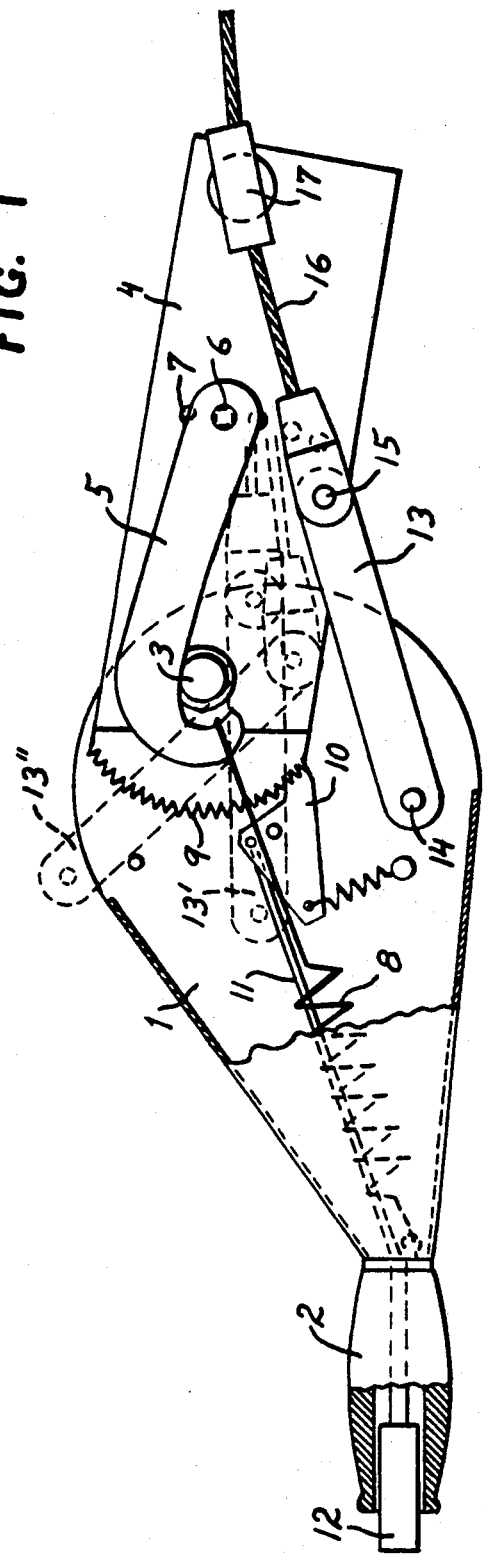
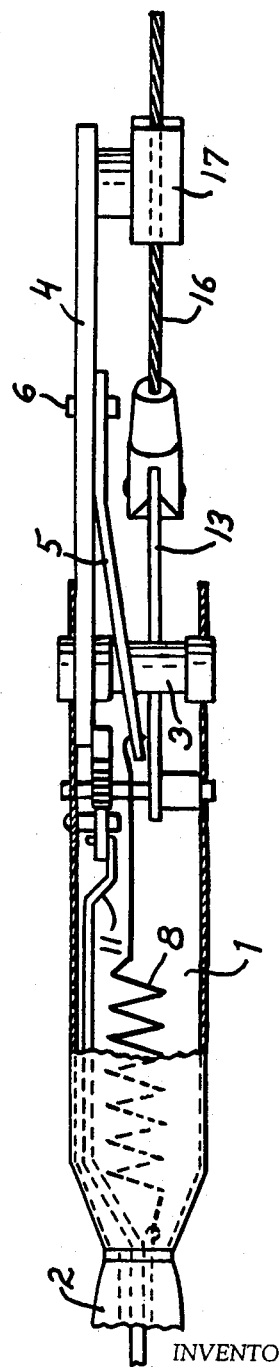
INVENTOR
Hans O. Schröter
BY Krafft & Wells
ATTORNEYS

United States Patent Office 3,400,606
Patented Sept. 10, 1968

3,400,606
HAND OPERATED BRAKE
Hans O. Schröter, 162 Schliesfach,
8 Munich 22, Germany
Continuation-in-part of application Ser. No. 470,371,
July 8, 1965. This application Apr. 24, 1967, Ser.
No. 633,231
Claims priority, application Germany, Mar. 1, 1965,
36,616; June 18, 1965, Sch 37,247
2 Claims. (Cl. 74—516)

ABSTRACT OF THE DISCLOSURE

A hand operated brake applying mechanism comprising a lever 1 adapted to be swung about a fixed axis 3, a swinging link 5 pivotable about a stationary axis 6 and having its free end connected to one end of a tension spring 8 whose remote and is anchored to the lever 1, the link 5 remaining in engagement with the axis 3 during the first portion of its swinging movement but disengaging the axis 3 and receding therefrom during the remaining portion of its swinging movement to assist in brake application, and a rigid bar 13 having one end thereof pivotally connected to the lever 1 while its other end is adapted to be pivotally connected to a vehicle brake, the bar 13 being at a distance from the axis 3 while the lever 1 is at rest but moving toward the axis 3 during initial swinging movement of the lever 1 with simultaneous increase of lever ratio until the bar 13 comes into engagement with the axis 3 when the lever ratio will be a maximum, the lever 1 and bar moving in unison during continued pivotal movement of the lever 1 while the lever ratio decreases.

Cross-reference to related applications

The present application is a continuation-in-part of application Ser. No. 470,371, filed July 8, 1965, now U.S. Patent 3,316,776, and is directed specifically to the modification shown in original FIGURES 3 and 4 of the earlier application, with only minor alterations. The device of the present application produces the same result as the device disclosed in the earlier application, but by means of a different mechanism.

The subject matter of the present application is related to applicant's German Patent 1,196,971.

Background of the invention

The field of the invention is hand operated control lever and linkage systems having a variable output force.

The state of the prior art is represented by U.S. Patents 1,540,247; 1,670,472; 2,555,811 and 2,588,027.

Summary of the invention

The present invention also relates to a hand brake with a variable ratio translating lever pivotable about a fixed axis and connected to the brake operating linkages in such a manner that the effective lever arm ratio increases during application of the brake until it reaches a maximum, and thereafter diminishes until the lever has reached the end of its swinging movement. The translating lever has a pretensioned spring connected to it in such a manner that the spring has little or no effect on the lever during the early part of its swinging movement, but comes into action to assist in the brake application after the lever has passed through a predetermined position which can be adjusted.

Description of the drawing and the preferred embodiment

The invention will now be described more in detail with reference to the drawing, wherein—

FIGURE 1 is a side view, partly in cross section, of the hand lever and its associated parts; and FIGURE 2 is a fragmentary plan view of the same.

The brake operating hand lever mechanism of the present invention comprises a lever 1 with a handle portion 2, mounted for pivotal movement on an axis 3, projecting laterally from a base plate 4 attached to a convenient part of the vehicle body. The plate 4 also carries a swinging link 5 pivotally mounted on a stationary axis 6 which can be positioned in any one of the holes 7 for adjustability, the holes 7 being arranged on a circle concentric with the axis 3. The free end of the swinging link 5 has a tensile spring 8 connected to it, the outer end of the spring being anchored to the lever 1 at a point adjacent the handle portion 2. While the lever 1 is at rest, and also during the early part of its swinging movement, the swinging link 5 remains leaning against the same axis 3 on which the lever 1 is pivotally mounted, the force exerted by the spring being approximately coplanar with the axis 3 so as to have little or no effect on the swinging movement of the lever. After the lever 1 has passed through a predetermined point, the exact location which will depend on which one of the holes 7 the axis 6 is seated in, the link 5 will move out of engagement with the axis 3 so that from there on the spring will assist in the swinging movement of the lever 1.

The vehicle brakes are actuated by a rigid link 13 having one end pivotally connected to a fixed anchorage 14 on the swinging handle 1, while the other end of this link is pivotally connected at 15 to a flexible cable 16 passing through a stationary guide 17 and from there to the vehicle brakes. While the hand lever is at rest, the link 13 is at a distance from the axis 3 but during the early movement of the lever the link 13 will gradually approach the axis 3, thereby gradually increasing the lever ratio, until it reaches the position 13' where it will be in contact with the axis 3 and where the lever ratio will be a maximum. From there on the hand lever 1 and the rigid link 13 will move pivotally in unison about the axis 3 until the link 13 has arrived at its final position 13", and during this last portion of the movement the lever ratio which was at a maximum in position 13' will decrease until position 13" is reached because the distance between the axis 3 and the line of pull of the cable 16 will increase.

Any suitable device such as the pawl and ratchet mechanism 9 and 10 operated by the pusher bar 11 and plunger 12 can be used for retaining the hand lever 1 in fixed position, the ratchet sector 9 being concentric with the axis 4 so that it can be engaged by the pawl 10 while the lever 1 is in any position.

Although a specific form of this invention has been shown and described in considerable detail, it is to be understood that many obvious changes can be made, especially in the shapes and dimensions of the parts.

I claim:

1. A hand operated brake applying mechanism comprising a lever (1) adapted for swinging movement about a fixed axis (3) by handle (2), a swinging link (5) pivotable about a stationary axis (6) and having its free end connected to means (8) for engaging said swinging link with said fixed axis during a first portion of the swinging movement of said lever and disengaging said swinging link from said fixed axis and receding therefrom during the remaining portion of the swinging movement of said lever to assist in brake application, and a rigid bar (13) having one end thereof pivotally connected to the lever (1) while its other end is adapted to be pivotally connected to a vehicle brake, the bar (13) being at a distance from the axis (3) while the lever (1) is at rest but moving toward the axis (3) during initial swinging movement of the lever (1) by said handle (2) with simultaneous increase of lever ratio until the bar (13) comes into engagement with the axis (3) when the lever ratio is a maximum, the lever (1) and bar moving in unison during continued pivotal movement of the lever (1) with a decrease in the lever ratio.

2. The hand operated brake of claim 1, wherein said means is a tension spring (8) whose remote end is anchored to the lever (1) between said fixed axis (3) and said handle (2).

References Cited

UNITED STATES PATENTS

| 2,555,811 | 6/1951 | Peterson. | |
| 2,588,027 | 3/1952 | McCarthy. | |
| 1,564,261 | 12/1925 | Mathieson et al. | 74—516 |
| 1,852,286 | 4/1932 | Bragg et al. | 74—516 |
| 1,977,786 | 10/1934 | Wiseman | 74—516 |
| 452,151 | 5/1891 | Whittingham | 74—97 |
| 1,540,247 | 6/1925 | Bowman | 74—97 |
| 1,670,472 | 5/1928 | Millward | 74—97 |

FOREIGN PATENTS 631,969    4/1927   France.

FRED C. MATTERN, JR., *Primary Examiner.*

W. S. RATLIFF, *Assistant Examiner.*